(12) United States Patent
Taylor

(10) Patent No.: US 6,270,226 B1
(45) Date of Patent: Aug. 7, 2001

(54) MULTI-VIEW IMAGING DEVICE

(76) Inventor: William G. Taylor, 2667 Camino Del Rio South., Suite 100, San Diego, CA (US) 92108

( * ) Notice: Subject to any disclaimer, the term of this patent is extended or adjusted under 35 U.S.C. 154(b) by 0 days.

(21) Appl. No.: 09/572,981

(22) Filed: May 16, 2000

(51) Int. Cl.[7] ........................................... G02B 5/08
(52) U.S. Cl. ..................... 359/866; 359/855; 359/854; 359/856
(58) Field of Search .................... 359/866, 855, 359/854, 856, 857, 860; 248/472, 473, 474, 476, 477, 479, 490, 495, 496

(56) References Cited

U.S. PATENT DOCUMENTS

| D. 142,985 | 11/1945 | Brown .................................. D29/20 |
| 370,623 | 9/1887 | Hooker . |
| 1,512,005 | 10/1924 | Wright . |
| 2,389,788 | 11/1945 | Lathrop .................................. 132/79 |
| 3,737,216 | 6/1973 | Noda ..................................... 350/306 |
| 4,208,105 | 6/1980 | Hadwiger ............................. 350/306 |
| 4,639,102 | 1/1987 | Fetko et al. ......................... 350/626 |
| 5,357,377 | 10/1994 | Payne, Jr. et al. ................ 359/855 |
| 5,430,578 | 7/1995 | Reagan ............................... 359/855 |
| 5,625,501 | 4/1997 | Taggert .............................. 359/855 |
| 5,673,153 | * 9/1997 | Soll et al. .......................... 359/846 |

FOREIGN PATENT DOCUMENTS

WO94/20867   9/1994   (WO) .............................. G02B/5/08

* cited by examiner

Primary Examiner—Mohammad Sikder

(57) ABSTRACT

A multi-image viewing device having two reflective sections adjacent to one another, a single flexible backing attached to the backs the two reflective sections such that a side edge of each of the reflective sections is adjacent to one another to thereby form a movable hinge, and a registration mechanism for adjustably setting the reflective sections into one or more of a plurality of angles adapted for viewing multi-images of a single object. The registration mechanism is a flexible strap pivotably connected at one end of one reflective section and is removably connectable at another end of the other reflective section. Indicia are on the strap or on the back side of one reflective section are used to set the reflective sections into one or more of a plurality of angles. The registration mechanism may also consist of a base member having multiple slots, each having predetermined angles, into which the two reflective sections insert.

5 Claims, 2 Drawing Sheets

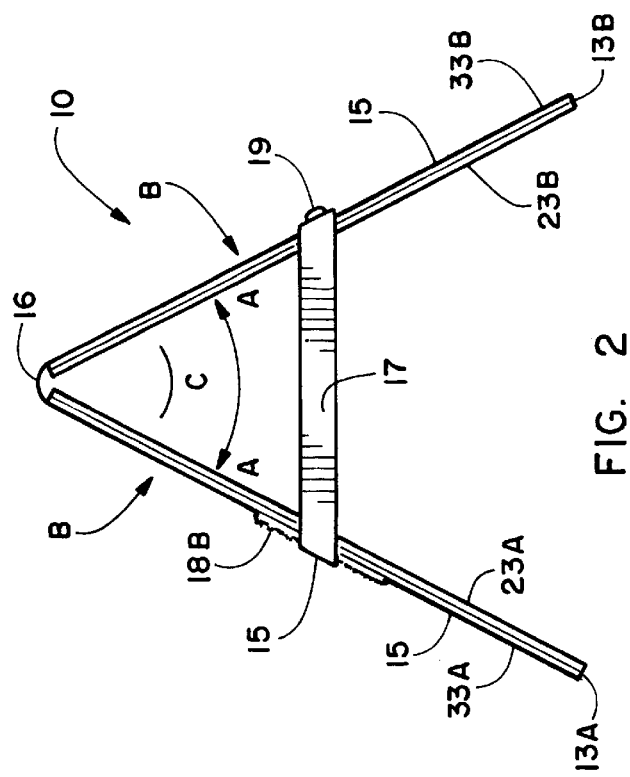
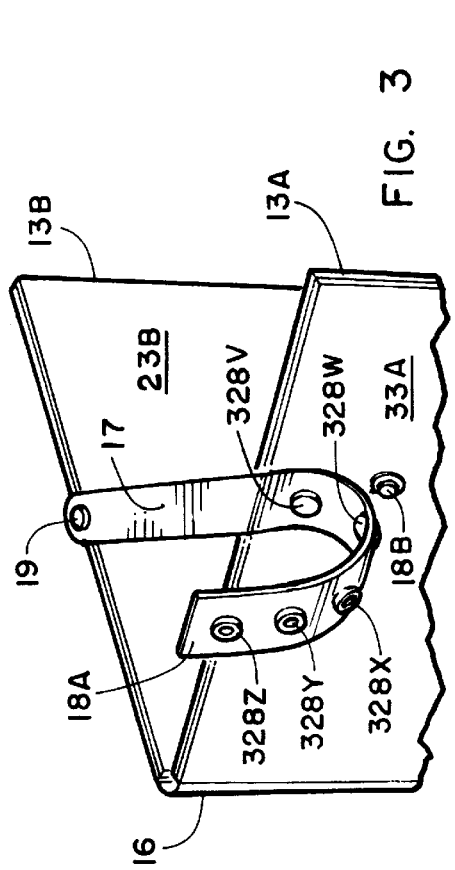
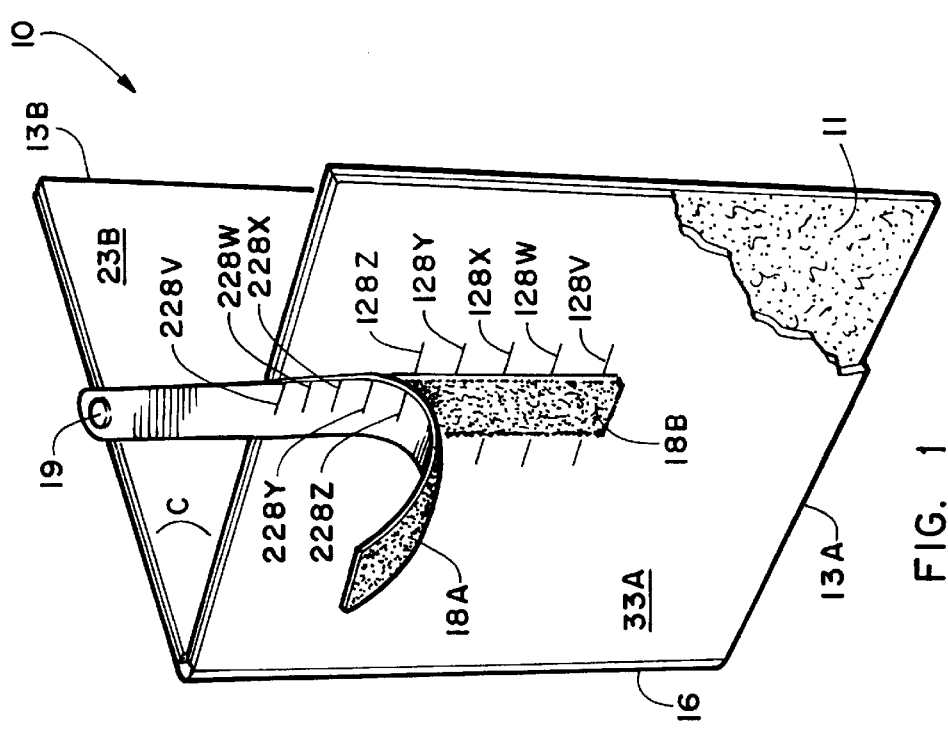

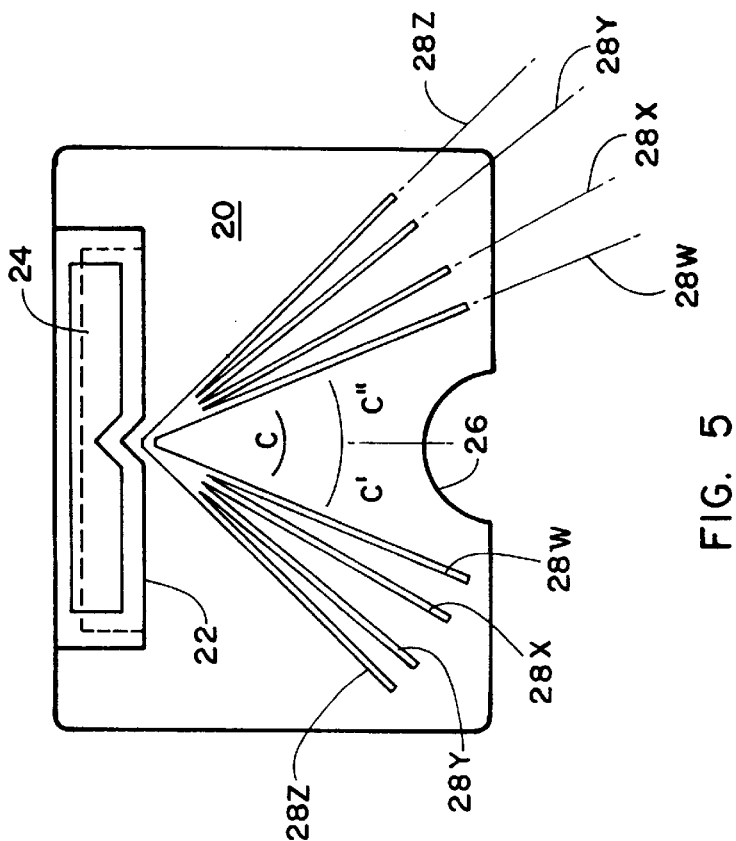
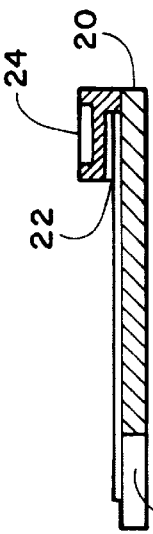
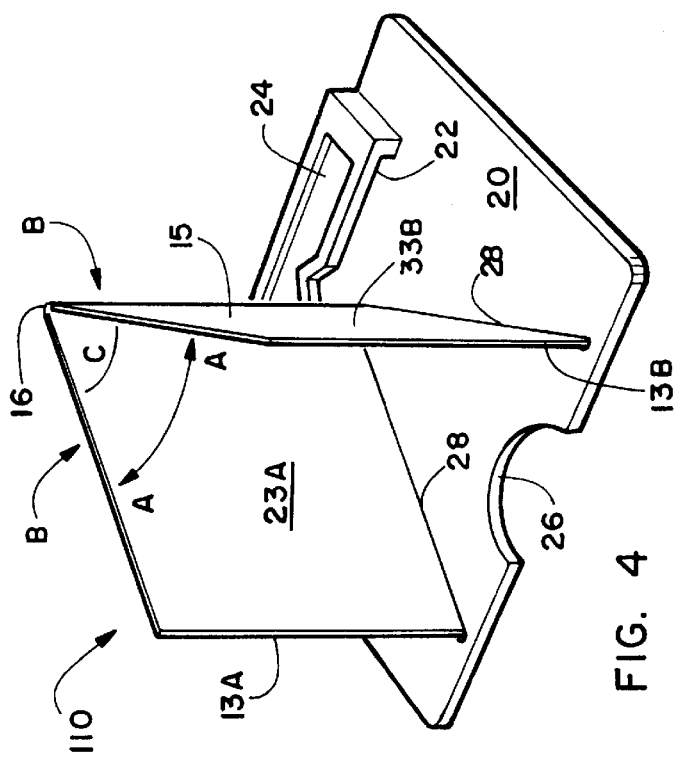
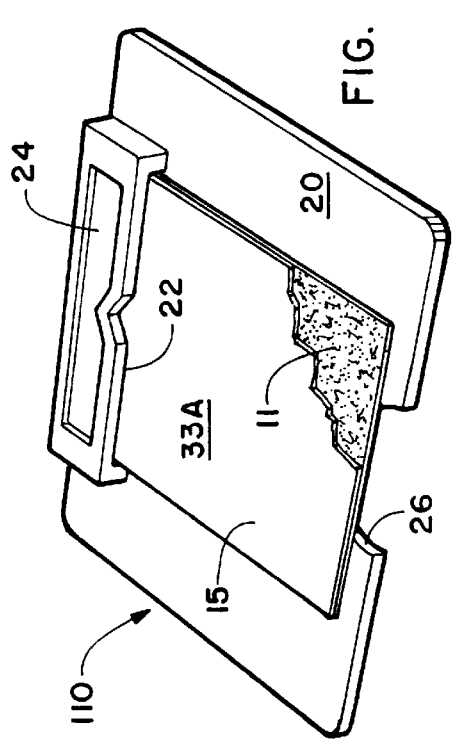
FIG. 5
FIG. 7
FIG. 4
FIG. 6

MULTI-VIEW IMAGING DEVICE

CROSS REFERENCES TO RELATED APPLICATIONS

Not applicable.

STATEMENT REGARDING FEDERALLY-SPONSORED RESEARCH OR DEVELOPMENT

Not applicable.

BACKGROUND OF THE INVENTION

This present invention relates to an improvement in viewing devices and mirrors, and more particularly to a viewing device capable of projecting multiple images of a single object/subject. These images can range from the traditional single image, as one projects when viewing a single plane mirror, up to nine or more images depending on the angles set for two adjacent reflective surfaces. This is particularly well-suited in the field of plastic and reconstructive surgery; and more specifically, to facial plastic and reconstructive surgery.

Prior art reveals several multi-image viewing devices and mirrors. The scope of these prior art devices was to project true images to a viewer. Of particular note are patents issued to Hooker, U.S. Pat. No. 370,623; and to Reagan, U.S. Pat. No. 5,430,578. Each are constructed of two reflective sections. The Hooker mirror is fixedly set at 90°; the Reagan mirror is hinged with a complex hinge structure such that the mirror sections fold onto one another. In the open position, a telescopic arm inserts into a predefined aperture such that this mirror, in the open state, is at a right angle arrangement. Each is well-suited for its intended purpose—to project a true image obtainable at a right angle setting. The first is simple, fixed, and non-adjustable; the second is more complex (especially in the hinge arrangement), is movable and foldable, but is not adjustable to a plurality of angles—it is pre-set at a 90° arrangement.

Other related prior art devices, such as the Fetko patent (U.S. Pat. No. 4,639,102) and the Payne patent (U.S. Pat. No. 5,357,377) are a bit more versatile but, in the process, are much more complex in structure and not suited for the purpose intended of the present invention. In the field of plastic surgery, particularly when the face and head are involved, the patient may not be able to adequately see or comprehend features of diagnosis or the fruits of the surgeon's efforts. If the reconstruction is frontal, generally any single plane mirror will suffice. If said feature is in the anterior/posterior plane, is contoured, or otherwise is obscured from direct frontal viewing, a mirror which enables multi-angular viewing is needed. This permits the patient to see, in one viewing, front, angled, and profile views of the anatomical feature in question. Easy adjustment of continuously variable angles of two mirrors permits additional views to be projected as needed. None of the prior art devices permits such multiple, adjustable views with such ease.

Accordingly, several objects and advantages of my invention are to:

a. permit a person to view multiple images, from two images to nine or more, at one viewing;

b. provide for a versatile, yet low-cost, multi-viewing device;

c. produce a multi-viewing device which is extremely easy to set up, to use, and to store; and d. provide one or more pre-determined multiple settings for use.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a continuously multi-variable angle, multi-view imaging device having two reflective sections adjacent to one another, a single flexible backing attached to the backs the two reflective sections such that a side edge of each of the reflective sections is adjacent to the other thereby forming a movable hinge, and a registration mechanism for adjustably setting the reflective sections into one or more of a plurality of angles adapted for what appears to the viewer to be a multi-angular viewing of a single object or subject. The angles may be certain predetermined angles, or may be set as desired by the user.

The registration mechanism may be a flexible strap pivotably connected at one end of one reflective section and is removably connectable at another end of the other reflective section. Indicia are on the strap or on the back side of one reflective section are used to set the reflective sections into one or more of a plurality of angles. The registration mechanism may also consist of a base member having single or multiple slots, each having predetermined angles, into which the two reflective sections insert. With this configuration, the device also has a storage slot (or receiving member) to store the reflective sections after they have been folded. A tray on top of the receiving member is adapted to hold personal articles of the user.

The foregoing has outlined the more pertinent and important features of the present invention in order that the detailed description of the invention that follows may be better understood and the present contributions to the art may be more fully appreciated. Additional features of the present invention will be described hereinafter, which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a perspective view of one embodiment of the mirror device.

FIG. 2 is a plan view of the device shown in FIG. 1.

FIG. 3 is a detailed view of a fastening and registration mechanism.

FIG. 4 is a perspective view of another embodiment of the mirror device.

FIG. 5 is a plan view of the device shown in FIG. 4.

FIG. 6 is a perspective view of the device shown in FIG. 4 in its stored position.

FIG. 7 is a side elevation view of the device shown in FIG. 6.

DETAILED DESCRIPTION OF THE INVENTION

Referring now to the drawings in detail and in particular to FIGS. 1 and 2, reference character 10 generally designates a multi-image viewing device constructed in accordance with a preferred embodiment of the present invention. It has at least two sections 13A and 13B. These sections 13A and 13B have a back side (33A and 33B) and a front side or face (23A and 23B). The face (23A and 23B, respectively) of each section 13A and 13B is reflective or mirror-like. The reflective surface, however, may also be on the back side of each section 13A and 13B. In a side-by-side, edge-to-edge, the sections 13A and 13B are covered by a flexible backing 15. This backing 15 may be of any material, such as, but not limited to, cloth, vinyl, rubber, polymer, and the like. It also may be padded or have padding 11 between it and the respective back side of the section 13A and 13B it covers. Each of the sections 13A and 13B are attached to the backing 15. Any conventional means of attachment, such as, but not limited to, gluing, will suffice. By such configuration, that is, side-by-side, a hinge 16 is formed thereby permitting the tandem movement or folding of the devices 10 in the directions designated by arrows A—A and B—B if FIG. 2. Movement in the direction of B—B permits the device 10 to fold onto itself with reflective surfaces or faces (23A and 23B, respectively) of sections 13A and 13B touching. Movement in the direction of A—A, permits the device 10 to fold onto itself with the backing 15 touching. It is this flexible hinge 16 which truly makes this device 10 exceptional and extremely versatile. Such movement permits sections 13A and 13B to assume any angle (represented by reference character C) from less than 1° up to 360°.

For the purposes associated with this invention, however, the device 10 has registrations to identify and set desired angles from between about 30° to about 125° (it must be understood, however, that greater and lesser angles may also be pre-set). The registration and adjustment of such angles is accomplished by use of a strap-like member 17 which is pivotably attached to either section 13A or 13B. For illustration purposes only, and not by way of limitation, FIGS. 1 and 2 have the strap-like member 17 pivotably connected to section 13B at or near its top edge. It must be understood, however, that the strap-like member 17 may also be pivotably connection to the back side of the respective section 13A or 13B, as the case may be. The strap-like member 17 is pivotably fastened thereat by a pivot member or pin-like fastener 19, such as, but not limited to, a rivet, a pin, a nail, a screw, and the like; provided, the strap-like member 17 is held in place but permitted to pivot without restriction as the section 13A and 13B are moved and folded and unfolded to various angles.

The underside of the strap-like member 17 has a fastening mechanism 18A, such as, but not limited to, VELCRO, hook-and-eye, snaps, magnets, and tabs, and the like. Corresponding fastening mechanisms 18B are located on the section opposite to the section holding the pivot member 19. In other words, if the pivot member 19 is on section 13B, the 'hook' of a hook-and-loop VELCRO-type fastener 18A would be on the underside of the strap-like member 17 and the corresponding fastening mechanisms 18B, or the 'loop' of a hook-and-loop or VELCRO-type faster would be on either the back side or adjacent to, or on, the top edge of section 13A. This type of fastening arrangement permits opening of the device 10, in the direction of arrows A—A to attain any desired angle and to fasten the strap-like member 17 onto the other section to thereby hold fast that desired angle. The angles may be adjusted to fit the user's needs. Any one of a plurality of angles may be set in this manner.

For the purposes intended, however, to view facial features in a clinical setting, certain pre-determined angles are preferable. To view three images, about 90° is desired; to view four images, about 70°–80° is desired; to view five images, about 60° is desired; to view six images, about 55° is desired, and to view seven images, about 45° is desired. For each of the angles designated, there may be a plus or minus 5° differential to still achieve the desired results. I have found that a six-image view, set at about 55°, plus or minus 5°, accord, a viewer excellent viewing results. It gives the viewer a direct right and left profile, and two intermediate proportional angles short of a full frontal view. Less views or more views, though attainable are not always desirable. It would depend on the nature of the facial or physical features involved in the reconstruction and the specific location[s]. Regardless, as configured this device 10 is capable of accommodating and adjusting to any angle; from less than 1° up to 360° if desired by the user and/or if or as necessary.

To further simplify use of this device 10, I have incorporated registration indicia 128V–128Z and/or 228V–228Z and/or 328V–328Z. Reference is made to FIG. 1. Such registration indicia may be on the outer surface of the strap-like member 17 (represented by reference characters 228V–228Z) or on the outside surface or back side of the respective section (here for illustration purposes only, it is on section 13A and is represented by reference characters 128V–128Z). As shown on these figures there are five registration points (#V–#Z). This is for illustration purposes only and not by way of limitation. More registration points or indicia may be included depending on the intended uses of the device 10.

For illustration only, if the indicia are on the outer surface of the strap-like member 17, such indicia are to be aligned with the upper or top edge of section 13A. Alignment at 228V, for example, yields an approximate angle of about 45° and is suited for viewing what appears to be seven different image-angles (or seven views of the same object at what appears to be views at different angles); at 228W the angle is about 55° and is suited for viewing the preferred six images; at 228X the angle is about 60° and is suited for viewing five images; at 228Y the angle is about 70°–80° and is suited for viewing four images; and at 228Z the angle is about 90° and is suited for viewing three images. With this configuration, the corresponding fastening mechanism 18B generally would be placed at or near the top of the outer surface of section 13A. A user would select his preferred image view, place the respective indicia such that it aligns with the top edge of section 13A, and fasten the strap-like member 17 onto the corresponding fastening mechanism 18B.

Again, for illustration only, if the indicia are on the back side of section 13A, it is the end of the strap-like member 17 which is to be used to set and register the desired angles. In this regard, placing the end of strap-like member 17 on indicia 128V yields an angle of about 45° and is suited for viewing seven images; placing the end of strap-like member 17 on indicia 128W yields an angle of about 55° and is suited for viewing the preferred six images; placing the end of strap-like member 17 on indicia 128X yields an angle of about 60° and is suited for viewing five images; placing the end of strap-like member 17 on indicia 128Y yields an angle of about 70°–80° and is suited for viewing four images; and placing the end of strap-like member 17 on indicia 128Z yields an angle of about 70°–80° and is suited for viewing three images. With such configuration, the corresponding fastening mechanism 18B is on the back side of section 13A adjacent to the indicia (128V–128Z).

FIG. 3 illustrates yet another form of fastening and registration of angles. In this illustration, the strap-like member 17 has multiple snaps or tabs as the fastening mechanism 18A and a single corresponding snap or tab on the outer surface of section 13A as the corresponding fastening mechanism 18B which, in this illustration is stationary. The multiple fastening mechanisms 18A are spaced such that snapping a different fastening mechanism 18A into the corresponding fastening mechanism 18B yields the different angles described above. Connecting the fastening mechanism 18A at 328V, for example, yields an approximate angle of about 45° and is suited for viewing seven images; fastening at 328W yields an angle of about 55° and is suited for viewing the preferred six images; fastening at 328X yields an angle of about 60° and is suited for viewing five images; fastening at 328Y yields an angle of about 70°–80° and is suited for viewing four images; and fastening at 328Z yields and angle of about 90° and is suited for viewing three images. It must be understood, however, that the single fastening mechanism 18B may be either on the back side of the section 13A or on the underside of the strap-like member 17 or the configurations may be reversed.

Another embodiment of this device 110 is illustrated in FIGS. 4–7. Sections 13A and 13B, with the backing 15, are configured as discussed above but without the strap-like member 17, without the pivot member 19, and without the indicia 128V–128Z or 228V–228Z or 328V–328Z serving as the registration and/or fastening mechanism. The registration mechanism for this embodiment is located at, and is part of, the base member 20. In FIG. 4, a pre-formed slot 28, into which sections 13A and 13B insert, form the registration at a single pre-defined angle; in this case, the angle is about 55°, plus or minus 5°, to thereby provide the preferred viewing of six images.

A guide member 26 is at the front edge or viewing edge of the base member 20. The guide member 26 is, basically centered between the outside or front edges of each section 13A and 13B; thereby generally bisecting angle C formed by the insertion of sections 13A and 13B into registration slots 28. When a viewer, therefore, places his head/neck into the guide member 26, he is in near perfect alignment to view all of the desired number of images for which that angle (C) is set. For added convenience to a user, this embodiment also has a tray 241 for holding external objects (such as earrings, hair pins, cosmetic make-up pencils and the like) while viewing the images. The tray 24 has a well or depression to keep the external objects from rolling or falling out of the tray 24 and off the device 110. It also may be magnetized.

Under the tray 24 is a receiving member or chamber 22 adapted to receive and hold in place the two sections 13A and 13B when not in use and are folded with surfaces 23A and 23B in touching relationship. FIGS. 6 and 7 illustrate this collapsed storing state. Padding 11 between the cover 15 and the back sides of the respective sections, 13A and 13B serve to more snugly store and secure the folded sections in the receiving member 22. Note the guide member 26 serves as a facilitator for a user to grasp the folded sections and to pull them from the receiving member 22. This is accomplished by the fact that the device 110 is structured such that the dimensions of sections 13A and 13B, when placed into the receiving member 22, project into the guide member 26.

FIG. 5 illustrates an embodiment of the base member 20 having a plurality of registration slots 28W–28Z. Inserting the sections 13A and 13B into registration slots 28W yields an angle of about 55° suited for viewing the preferred six images; inserting the sections 13A and 13B into registration slots 28X yields an angle of about 60° suited for viewing five images; inserting the sections 13A and 13B into registration slots 28Y yields an angle of about 70°–80° suited for viewing four images; and inserting the sections 13A and 13B into registration slots 28Z yields an angle of about 90° suited for viewing three images. Guide member 26 is positioned such that it is centered on the pre-defined angles (bisects each angle such that angle C' and C" are about equal or about ½ of angle C). Angle relative to 45° has not been shown in this figure due to drawing constraints only and not because the device cannot be structured to accommodate such angle and other angles.

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiment[s] illustrated, but by the appended claims and their legal equivalents.

The invention claimed is:

1. A multi-view imaging device comprising:
   a. at least two reflective sections adjacent to one another, said at least two reflective sections having a face and a back;
   b. a single flexible backing attached to the backs of said at least two reflective sections such that a side edge of each of said at least two reflective sections is adjacent to one another to thereby form a hinge thereat; and
   c. registration means for adjustably setting said at least two reflective sections into one or more of a plurality of angles adapted for viewing multi-images of a single object, wherein said registration means comprises a base member having a plurality of V-shaped slots therein into which said at least two reflective sections are insertable and retainable therein.

2. The device as defined in claim 1 wherein said plurality of V-shaped slots range in angle from about 30° to about 125°.

3. The device as defined in claim 1 further comprising a guide member on a front edge of said base member.

4. The device as defined in claim 1 further comprising a receiving member on top of said base member, said receiving member adapted to receive and hold said at least two reflective sections when said at least two reflective sections are folded closed and inserted into said receiving member.

5. The device as defined in claim 4 further comprising a tray on top of said receiving member, said tray adapted to receive and hold thereon external objects.

* * * * *